United States Patent
Herrmann

(10) Patent No.: US 11,373,074 B1
(45) Date of Patent: Jun. 28, 2022

(54) HEIGHT ADJUSTABLE TRANSPORT MODULE WITH INTEGRATED INTEGRITY FOR IN-LINE PRINTER SYSTEMS

(71) Applicant: XEROX CORPORATION, Norwalk, CT (US)

(72) Inventor: Douglas K Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/317,130

(22) Filed: May 11, 2021

(51) Int. Cl.
*H04N 1/40* (2006.01)
*G06K 15/00* (2006.01)
*G06K 15/16* (2006.01)

(52) U.S. Cl.
CPC ........... *G06K 15/408* (2013.01); *G06K 15/16* (2013.01)

(58) Field of Classification Search
CPC .............................. G06K 15/408; G06K 15/16
See application file for complete search history.

(56) References Cited

U.S. PATENT DOCUMENTS

| | | | | |
|---|---|---|---|---|
| 5,899,649 A | * | 5/1999 | Kohtani | B42C 9/0075 412/11 |
| 2009/0293750 A1 | * | 12/2009 | Haenni | B41J 3/60 101/484 |
| 2010/0157326 A1 | * | 6/2010 | Mori | G03G 15/6573 358/1.5 |
| 2013/0182058 A1 | * | 7/2013 | Moriyama | B65H 20/20 347/104 |
| 2016/0086070 A1 | * | 3/2016 | Kikumoto | G06K 15/408 358/1.15 |
| 2018/0157446 A1 | * | 6/2018 | Fukuda | B41J 29/48 |

* cited by examiner

*Primary Examiner* — Huo Long Chen
(74) *Attorney, Agent, or Firm* — William A. Henry, II

(57) ABSTRACT

An in-line integrity module houses a camera/reader system to check for sheet and job integrity. The integrity module includes paper path structure that is adjustable between two different heights to match paper path heights of upstream or downstream devices.

8 Claims, 5 Drawing Sheets

HEIGHT ADJUSTABLE TRANSPORT MODULE WITH INTEGRATED INTEGRITY FOR IN-LINE PRINTER SYSTEMS

BACKGROUND

The presently disclosed embodiment is directed to printing, and more particularly, to maintaining integrity of printer output.

While printer software and scheduling plans for image content on duplex sheets, there exists on possibility for the image imposition to be incorrect. When this happens, sensitive data can be comingled on the sheet. For financial and health print jobs it is imperative that the image integrity on each sheet on both sides matches the job recipients' credentials. If the printer scheduling has a glitch there is a chance to have the wrong image placed on the duplex side. This could include another customer's confidential information.

An integrity solution is used in production printer systems to confirm the appropriate printing of a customer sensitive data. For example, duplexed financial statements can be confirmed via optical codes and a camera system to ensure the first side of the printed page and the second side of the printed page are for the correct customer and the scheduling confirming the scheduling function in the printer. This solution by definition is a separate part of the scheduling system and operates outside the printing of the document. The check happens and confirms or rejects the document. While rejecting the document is rare, in financial and health transactions, the customers need to have integrity of print is understood. An integrity solution also needs to accommodate differing exit heights of printer and finishing equipment. While each printer platform could have a unique custom integrity solution, this would mean a complex solution path and logistics path as each system would have different requirements for location and a custom mechanical mounting solution each. In order to provide a solution that has the flexibility to span different print platforms a device is needed that is low cost and capable of being installed within the print and finishing train. Unfortunately, the modules available such as a height transition module or post finishing integrity module do not provide enough space for the integrity function and are product specific.

SUMMARY

Accordingly, in answer to this need, disclosed herein is an in-line integrity module housing a camera/reader system to check for sheet and job integrity. The integrity module includes a paper path that is adjustable between two different heights to match a printer paper path whether pre-marking or post marking. This integrity module allows for a flexible system that can be configured and customized to customer requirements while reducing the need to customize either the printer, the finisher or any other dedicated module, such as, the height transition module or pre-finisher imaging module.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
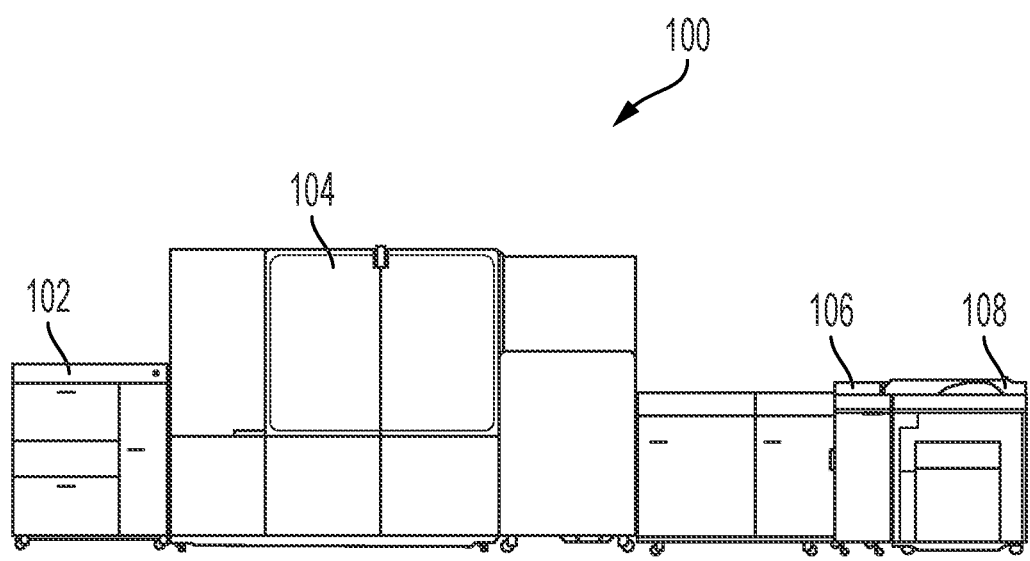
FIG. 1 is an elevational view that includes a height transition module upstream of a finisher.

For a general understanding of the features of the disclosure, reference is made to the drawings. In the drawings, like reference numerals have been used throughout to identify identical elements.

FIG. 1 shows a schematic illustration of a printer 100 that generally includes one or more sources 102 of printable roll to sheet substrate media that are operatively connected to a printer engine 104, and an output path that leads through a height transition module 106 and then into a finisher 108. The printer engine 104 may be a multi-color engine having a plurality of imaging/development subsystems that are suitable for producing individual color images. A stacker device 112 shown in FIG. 6 may also be provided in the art.

The print engine 104 employs ink jet marking; however, it will be appreciated that other marking technologies may be used, for example by xerographically marking, ionographically marking or the like. In this implementation, the printer 100 may be a Xerox® Baltoro™ HF Inkjet Press. For example, the print engine 104 renders ink images of input data directly onto substrates.

Figure 2:
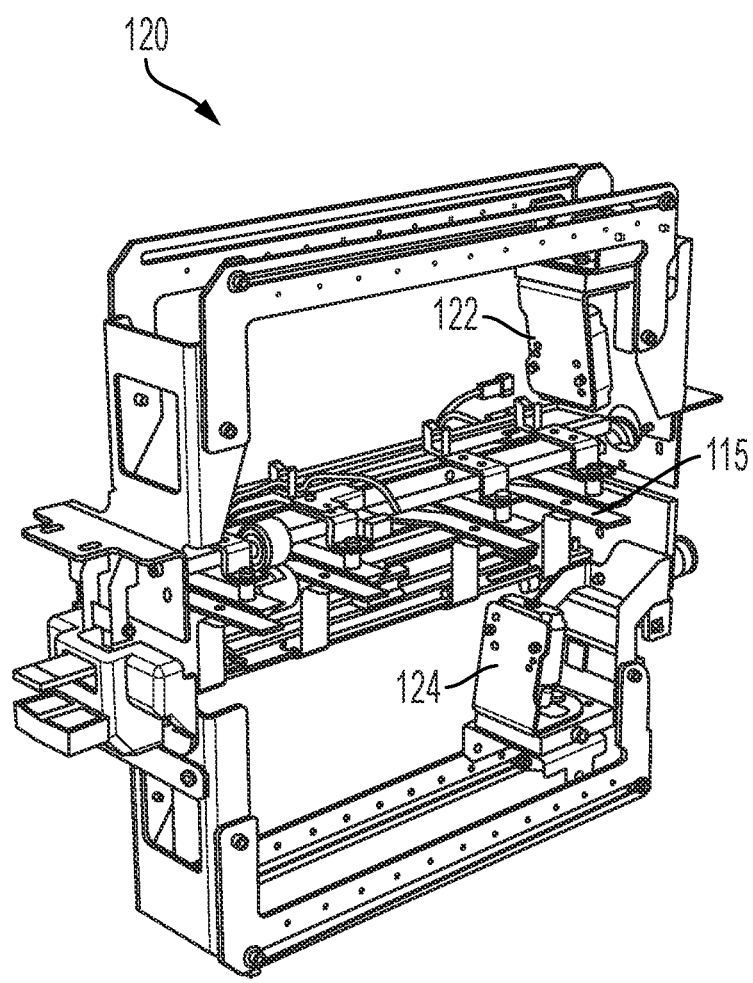
FIG. 2 is a partial isometric view of an integrity platform with camera systems mounted above and below a media path.
Figure 3:
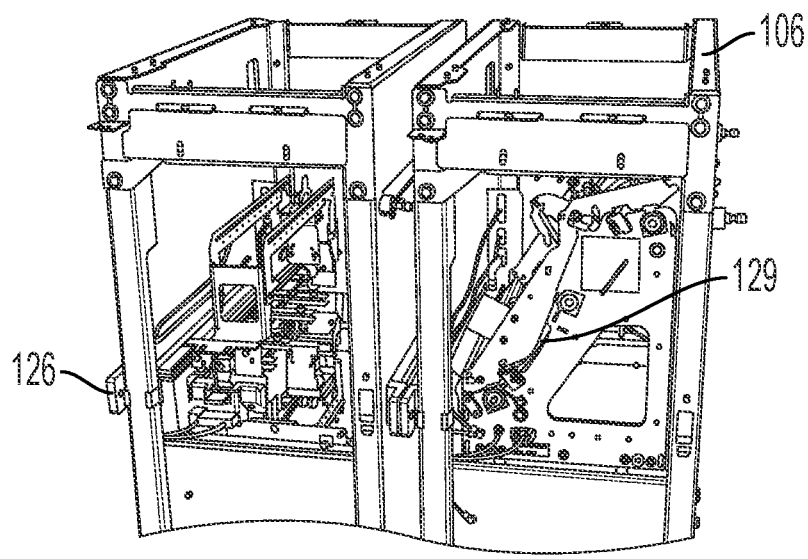
FIG. 3 is a partial isometric view of the integrity module in accordance with the present disclosure positioned upstream of a height transition module.
Figure 4:
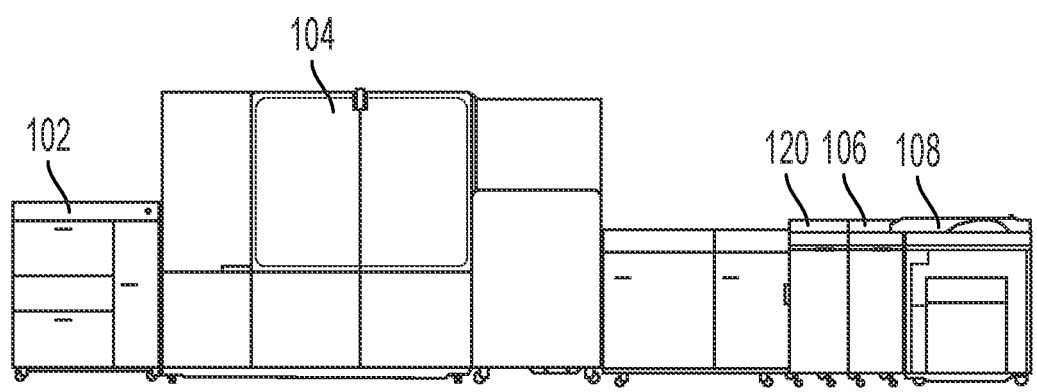
FIG. 4 is a partial isometric view of the integrity module in accordance with the present disclosure positioned upstream of a finisher.
Figure 5:
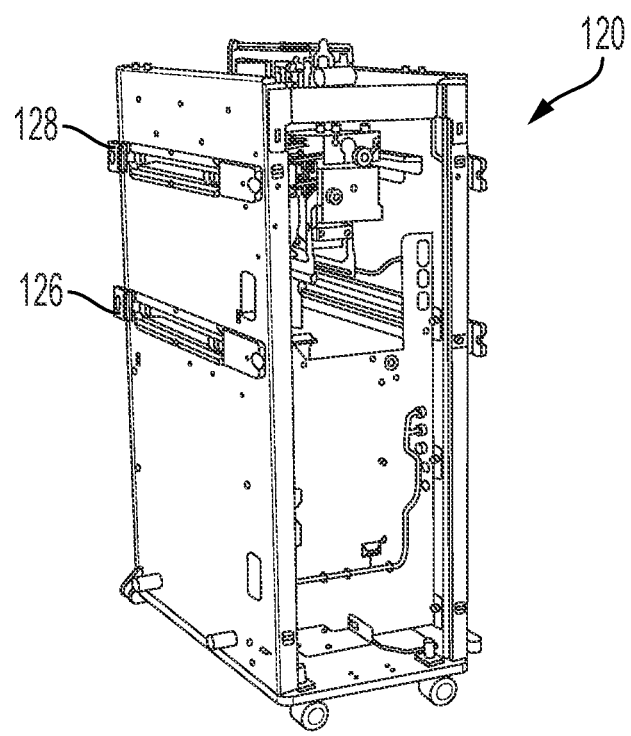
FIG. 5 is an integrity module showing upper and lower mounting options that match printer heights or stacker heights.
Figure 6:
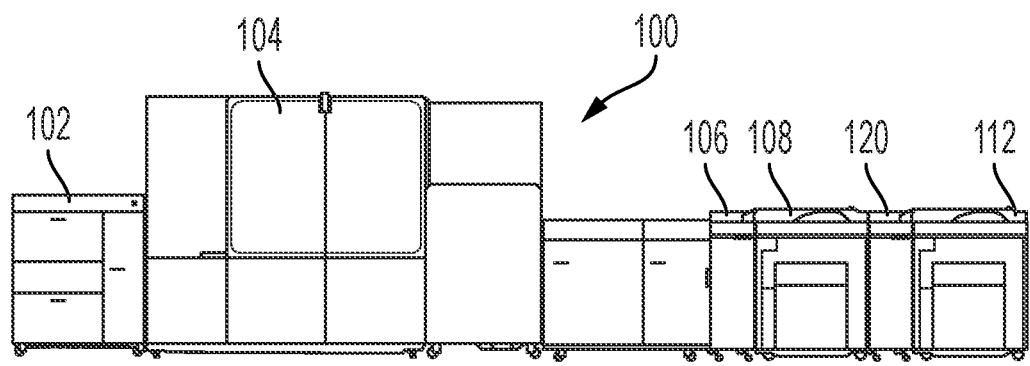
FIG. 6 is an elevational view showing an integrity module in accordance with the present disclosure positioned downstream of a finisher.

In accordance with the present disclosure, a flexible integrity module 120 is disclosed that can be attached to each of the printer systems upstream or downstream of finishing equipment, such a stacker. As shown in FIG. 2, integrity module or platform 120 includes a height adjustable media path 115 through the module transport system that allows Cognex Dataman 150 cameras 122 and 124 to be placed above and below the path of media at a variable heights to match the input/output of the particular system. That is, when integrity module 120 is placed directly downstream of print engine 104 as shown in FIG. 4 the height of the height transition module 106 would be set to a low setting to receive media through input 126 as shown in FIG. 3 and height transition module 106 would be placed next in-line to move sheet output from the integrity module 120 up through path 129 to the input height of finisher 108. In situations where integrity module 120 is placed after finisher 108 as shown in FIG. 6, the Integrity system would be set to its highest location to receive media through input 128 as shown in FIG. 5, thus allowing finisher 108 to handoff the output sheets to stacker 112. If desired, cameras 122 and 124 could be replaced with a conventional scanning system that would scan an optical character on both simplex and duplex sides of a customer image to maintain job integrity.

Integrity module 120 makes use of frame structure of height transition module 106 and introduces a horizontal and height adjustable baffle system to be used at differing locations within the print and finishing train. By keeping integrity module 120 separate from the rest of the print and finishing train and by making the paper path of integrity module 120 adjustable, flexibility is provided to be used across different product lines and different product configurations. The disclosure allows for a flexible integrity system that can be configured and customized to customer requirements of an extra layer of integrity for their sensitive documents while simultaneously reducing the need to customize either the printer, the finisher or any other dedicated modules, such as, the height transition module or pre-finisher imaging module.

Figure 7:
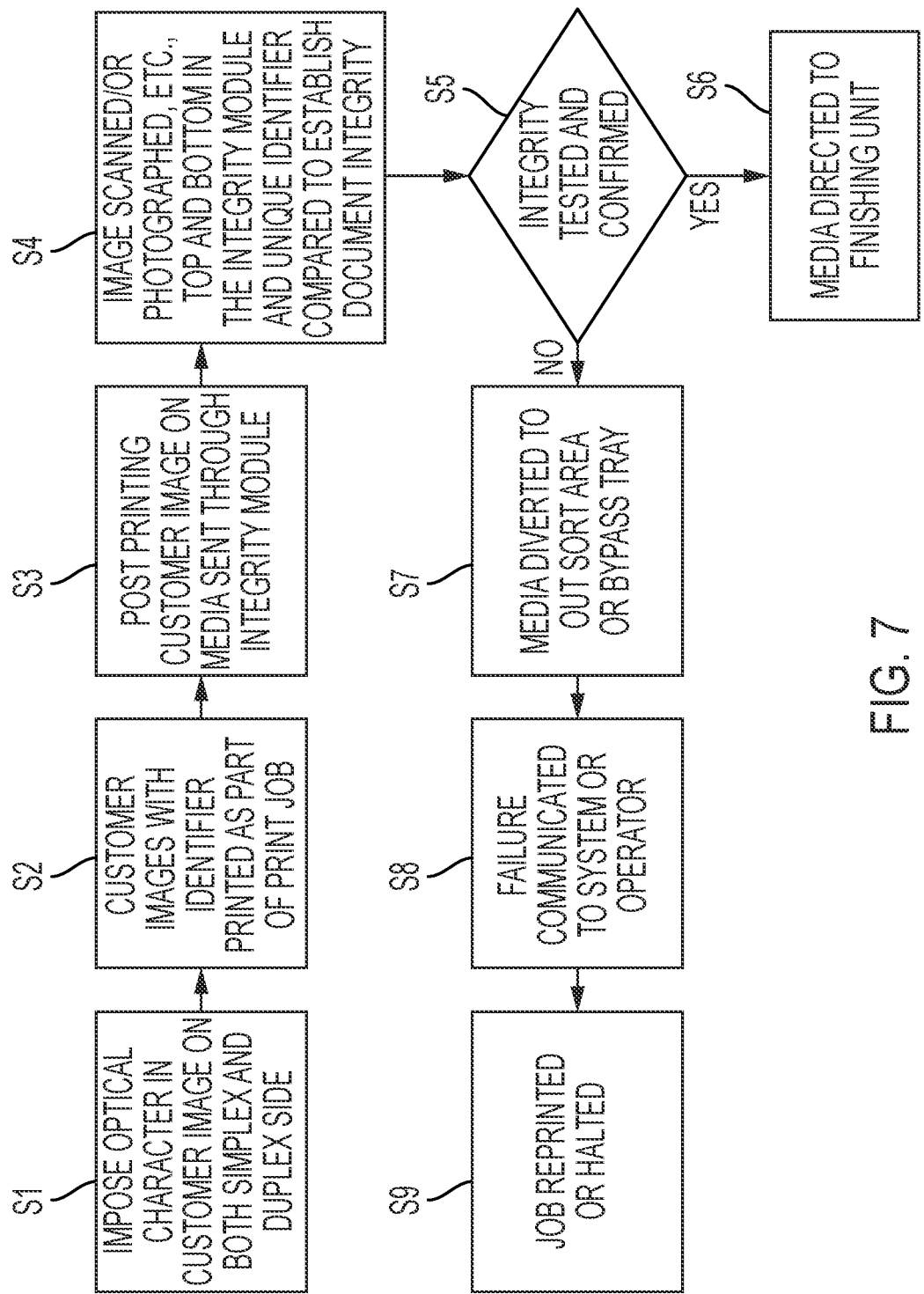
FIG. 7 is a process flowchart depicting media integrity evaluation in accordance with the present disclosure.

In practice, as shown in the flowchart process in FIG. 7, maintaining media job integrity includes imposing an optical character on both simplex and duplex sides of a customer image in step S1. In step S2 the customer image is printed with an identifier included as part of the print job. As shown in step S3, after printing the customer image is conveyed through an integrity module where the image is scanned or photographed, etc., in step S4 top and bottom where the unique identifier of step S2 is compared in step S5 to established document integrity. If document integrity is confirmed the media in step S6 is directed to a finishing unit. If, however, the document integrity test in step S5 is not confirmed, i.e., the identifier on the simplex side of the media does not match the identifier on the duplex side, the media in step 7 is diverted to an out sort area, such as, a bypass tray, stacker or a printer top tray. A failure communication in step 8 is then sent to the system or operator and in step 9 the job is either reprinted or halted.

It should now be understood that an adjustable integrity module has been disclosed that allows for installation upstream or downstream of printer finishing systems. The module is self-contained and allows for providing integrity to a printer/finishing system for customers requiring extra media integrity, but who have different printer systems within their workflow. The integrity module has the ability to be height adjusted to set up for upper or lower paper paths. Thus, making the integrity module universal for locations at the back end of a print system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A printing system configured to image media and maintain integrity of images on said media, comprising:
   a printer including a print engine;
   a feed source for feeding media past said print engine to receive images thereon;
   a height transition module configured to receive said media from said print engine and convey said media through an upwardly inclined paper path to an output position;
   a finisher positioned downstream from said height transition module and configured to receive media from said height transition module; and
   an integrity module positioned to receive said media and feed said media downstream while simultaneously checking correctness of image imposition of said media, and wherein said integrity module includes frame structure having first and second input openings for receiving said media, a horizontal height adjustable media transport configured to receive media from said first and second input openings and cameras positioned above and below said horizontal height adjustable media transport, and wherein said horizontal height adjustable media transport is placed in-line with said first input opening of said frame structure when said integrity module is positioned directly downstream of said printer and placed in-line with said second input opening of said frame structure when said integrity module is positioned directly downstream of said finisher thereby enabling said finisher to handoff said media to another downstream device.

2. The printing system of claim 1, wherein said media passes horizontally through said height transition module when said integrity module receives media from said second input opening of said frame structure.

3. The printing system of claim 1, wherein said media passes along said upwardly inclined paper path through said height transition module when said integrity module receives media from said first input opening of said frame structure.

4. The printing system of claim 3, wherein said integrity module facilitates installation upstream or downstream of said finisher.

5. The printing system of claim 1, wherein said cameras positioned above and below said horizontal height adjustable media transport are configured for adjusting to differing heights.

6. An integrity module for confirming the appropriate printing of customer sensitive data in an in-line printing system, said integrity module comprising:
   paper path structure through which sheets are conveyed;
   cameras positioned above and below said paper path structure;
   frame structure adapted to support said paper path structure and said cameras, said frame structure having first and second input openings for receiving said sheets; and
   wherein said paper path structure is configured to be movable between said first and second input openings of said frame structure depending on whether sheets are coming from upstream or downstream devices having sheet exit positions at differing heights, said movable paper path being placed in-line with said first input opening of said frame structure when said integrity module is positioned directly downstream of a printer and placed in-line with said second input opening of said frame structure when said integrity module is positioned directly downstream of a finisher thereby enabling said finisher to handoff said sheets to a subsequent downstream device.

7. The integrity module of claim 6, wherein said integrity module is positioned before a height transition module.

8. The integrity module of claim 7, wherein said paper path structure of said integrity module is hi a first position of two positions.

* * * * *